Dec. 7, 1926.
M. S. CUMNER ET AL
1,609,990
CONTROL MECHANISM FOR RELIEVING LATHES
Filed May 3, 1923  4 Sheets-Sheet 1
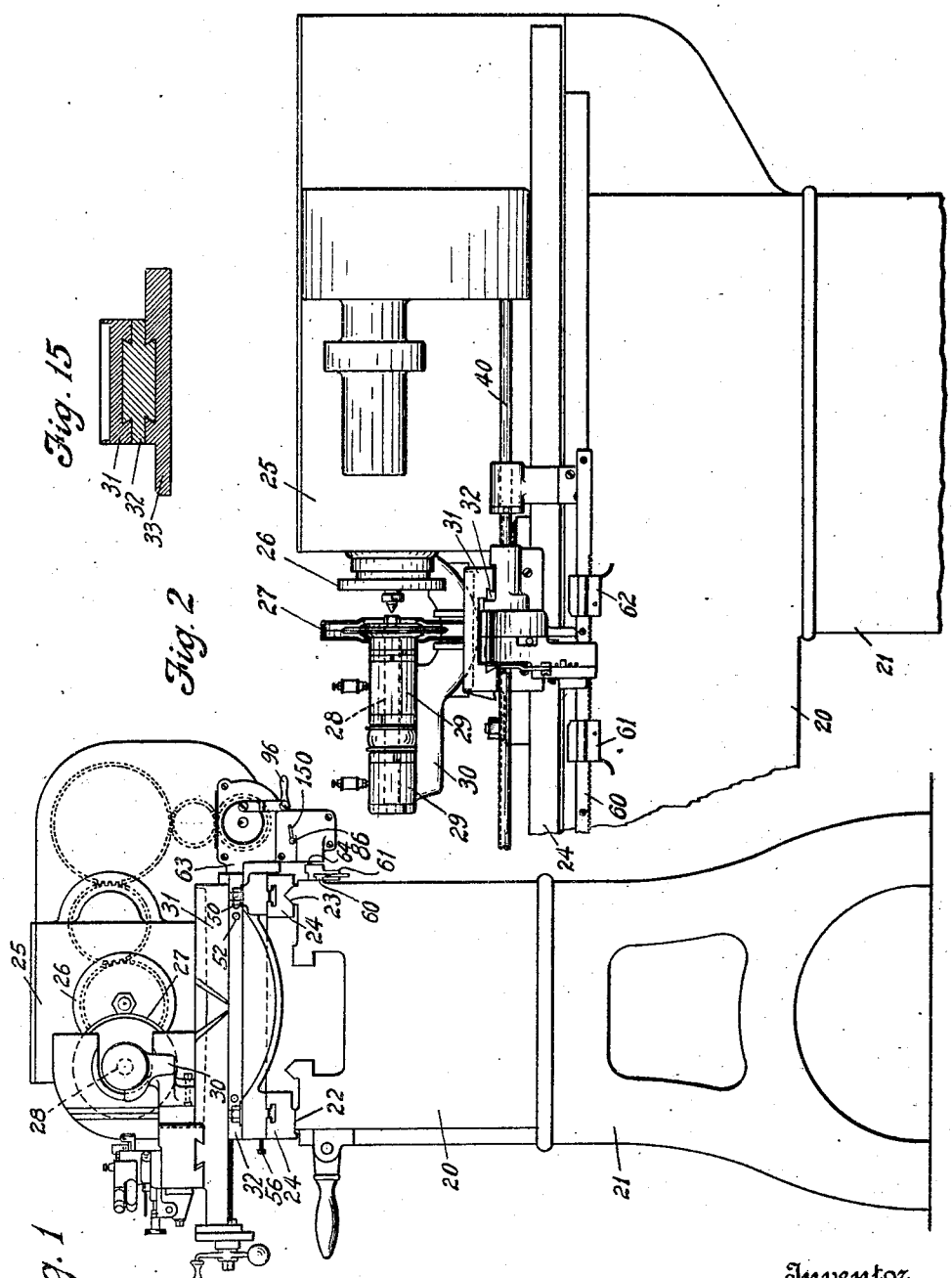
Inventor
Matthew S. Cumner
Frederick W. Geissenhainer
By their Attorney

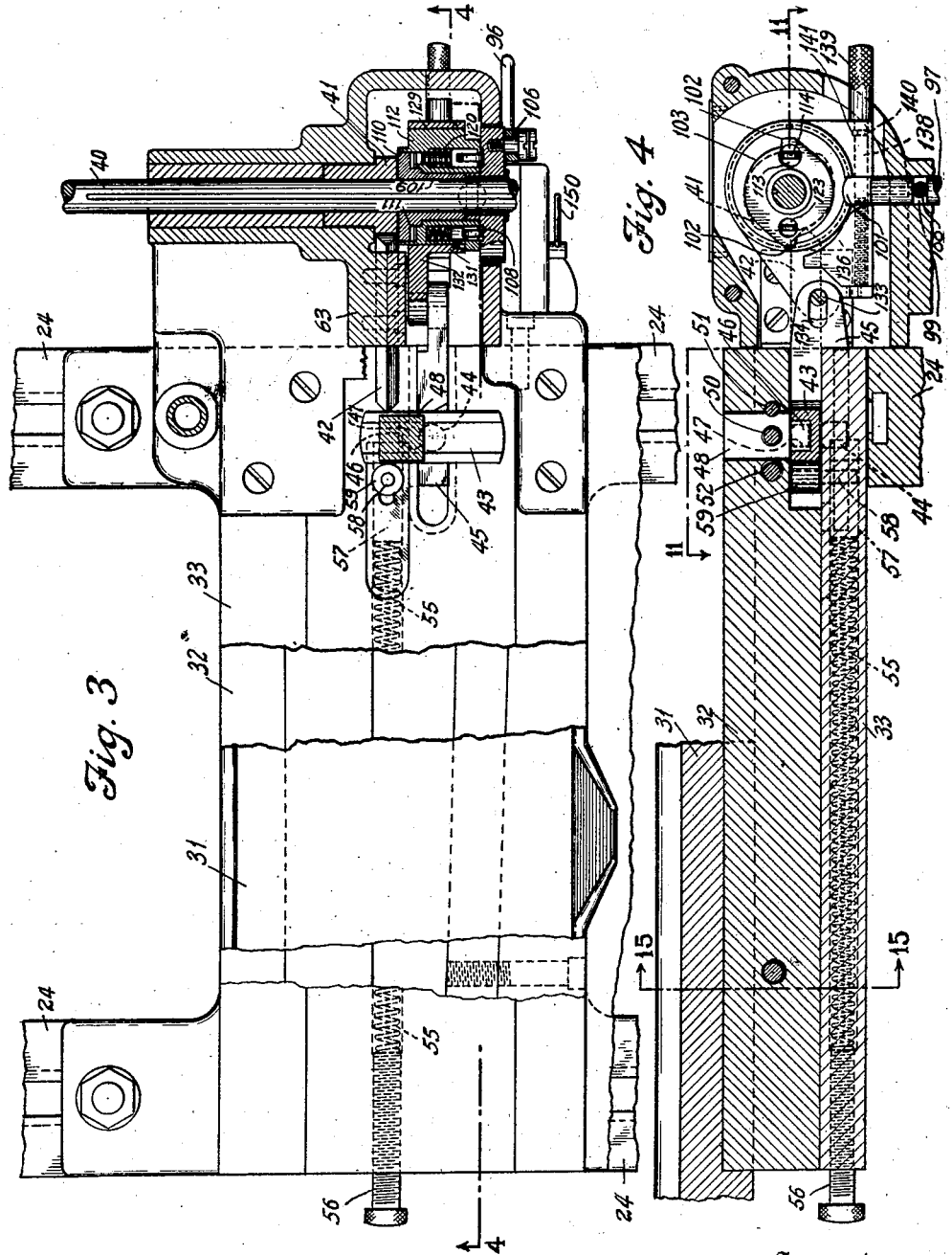

Dec. 7, 1926.  
M. S. CUMNER ET AL  
1,609,990  
CONTROL MECHANISM FOR RELIEVING LATHES  
Filed May 3, 1923  
4 Sheets-Sheet 3
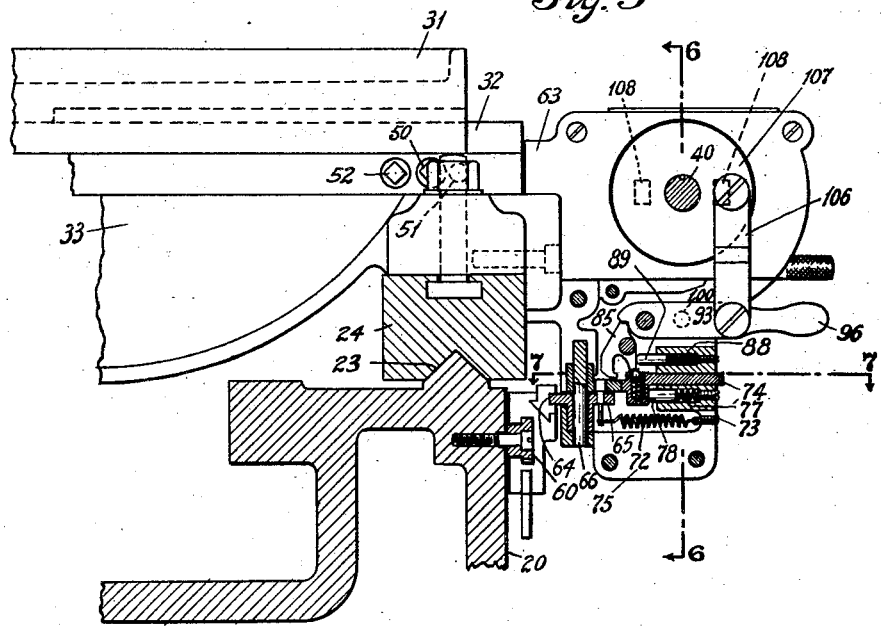
Inventor  
Matthew S. Cumner  
Frederick W. Geissenhainer  
By their Attorney  
E. W. Marshall

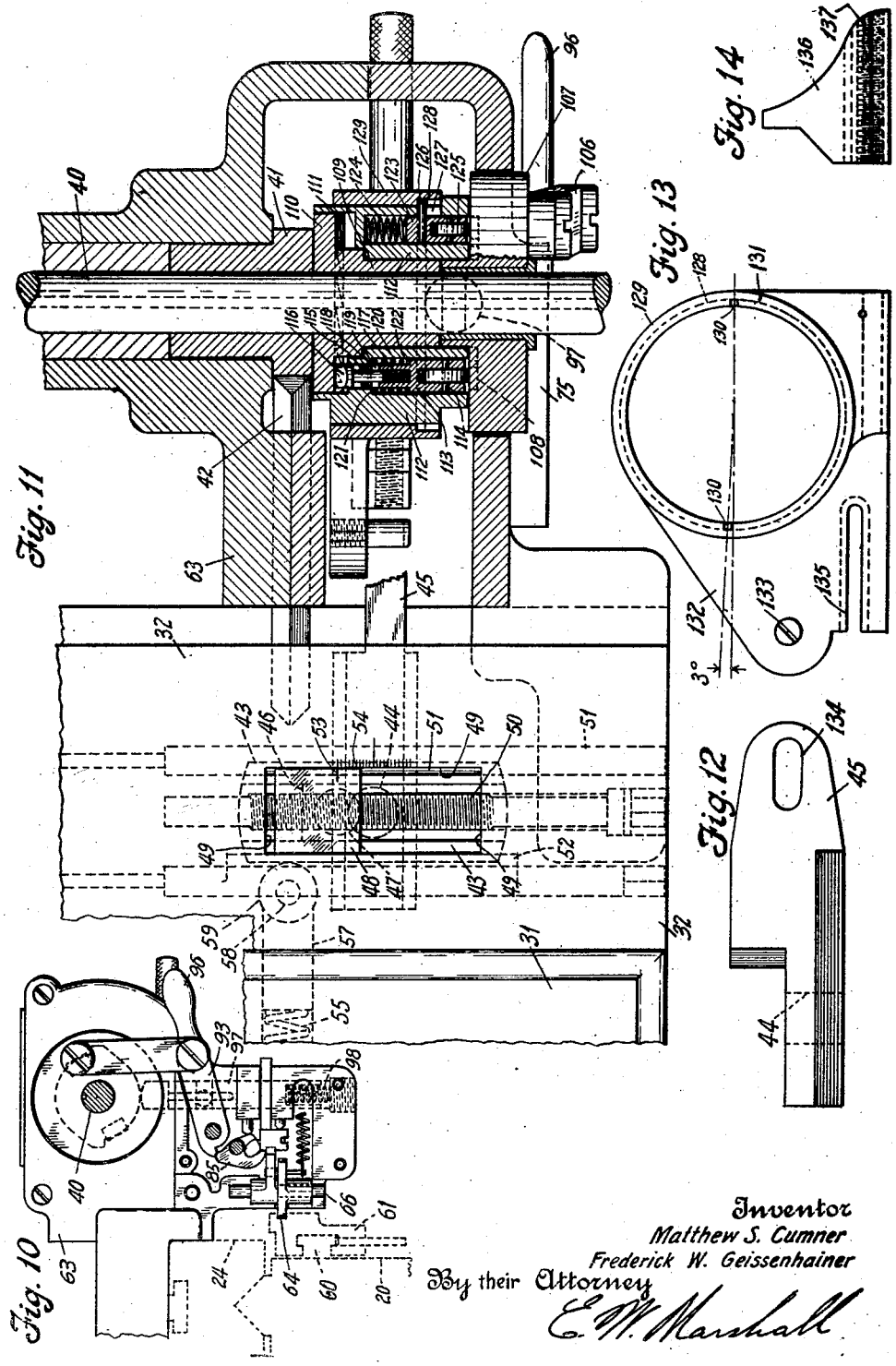

Patented Dec. 7, 1926.

1,609,990

UNITED STATES PATENT OFFICE.

MATTHEW S. CUMNER, OF BROOKLYN, NEW YORK, AND FREDERICK W. GEISSENHAINER, OF FREEHOLD, NEW JERSEY, ASSIGNORS TO NESTOR MANUFACTURING COMPANY, INC., OF NEW YORK, N. Y., A CORPORATION OF NEW YORK.

CONTROL MECHANISM FOR RELIEVING LATHES.

Application filed May 3, 1923. Serial No. 636,357.

This invention relates to cutting or grinding machines of the type used in making master hobs, taps, screws, or hardened master gauges and similar articles.

One of the objects of the invention is to provide a machine of the character described so constructed and arranged that the cutter or grinder may be adjusted and operated with great precision and exactness.

Another object of the invention is to provide in a machine of the class described easily and accurately adjustable means for effecting the backing off of the grinder or cutter.

Another object of the invention is to provide effective automatically operable means for moving the cutter or grinder clear of the work at the end of the cut and for returning the cutter or grinder to operative position.

Another object of the invention is to provide a machine of the character described so constructed and arranged that the work may be duplicated with great precision and exactness.

Another object of the invention is to provide in a machine of the class described easily and accurately adjustable means for effecting the backing off or relieving a hob, tap or similar article.

Another object of the invention is to provide in a machine of the class described easily and accurately adjustable means for effecting concentric grinding and cutting or the backing off or relieving as desired by the operator.

Further objects of the invention will appear from the following specification taken in connection with the drawings which form a part of this application and in which:

Fig. 1 is an end elevation of a machine constructed in accordance with the invention, the tail stock being removed for the sake of clearness.

Fig. 2 is a rear elevation of a portion of the machine, the tail stock not being shown.

Fig. 3 is a top plan view, partly broken away and partly in section, of the mechanism for effecting the backing off and clearance movement of the cutter.

Fig. 4 is a sectional elevation taken at right angles to Fig. 3 and substantially on line 4—4 of Fig. 3.

Fig. 5 is an elevational view, partly in section showing the operative parts of the trip mechanism by means of which the cutter or grinder is moved clear of the work.

Fig. 6 is a sectional elevation taken substantially on line 6—6 of Fig. 5.

Fig. 7 is a sectional elevation on an enlarged scale taken substantially on line 7—7 of Fig. 5.

Fig. 8 is a perspective view showing the trip finger and cam for releasing the trigger and starting in motion the movement of the cutter away from or toward the work, as the case may be.

Fig. 9 is a sectional elevation on an enlarged scale showing the trigger and latching and reset lever.

Fig. 10 is a sectional elevation similar to Fig. 5 but showing the parts in tripped position.

Fig. 11 is a view on an enlarged scale, partly in plan and partly in section, of the construction shown in Fig. 1, the sectional portion of this view being taken substantially on line 11—11 of Fig. 4.

Fig. 12 is an enlarged detail elevational view showing the slide through which the motion of the throw-out movement is transmitted to the carriage, on which the cutter is mounted, from the eccentric strap.

Fig. 13 is an enlarged elevational view of the eccentric strap.

Fig. 14 is an enlarged elevational view of the adjustable nut positioned between the eccentric strap and the slide shown in Fig. 12, and Fig. 15 is a sectional elevation taken substantially on line 15—15 of Fig. 4.

The invention briefly described consists of a machine comprising a rotary cutter or grinder mounted upon a movable carriage and means for giving a backing off movement to the cutter or grinder during the operation of the tool when the machine is operating to cut hob teeth or similar structures and also including means for automatically moving the cutter or grinder clear of the work when the tool has reached the end of the work and for automatically returning the tool to the work when the tool and carriage have been reversed and are positioned at the opposite end of the work. In connection with the backing off mechanism, means has been provided for accurately and precisely adjusting the parts so that any desired amount of backing off movement may be obtained. Also in connection with the tool throw-out mechanism or mechanism for moving the tool clear of the work, adjustable means has been provided whereby the amount of this movement may be accurately determined. Further details of the invention will appear from the following specification.

The grinding machine may be of any desired construction and in the form illustrated in the drawings, comprises a bed 20 supported on a base 21 and having parallel rails 22 and 23 formed thereon. A frame comprising a pair of longitudinally extending frame members 24 is mounted for longitudinal adjustment on the tracks 22 and 23 and upon this frame are supported the tail stock and head stock of the machine.

The tail stock has not been illustrated but is of the usual construction and the head stock 25 has a face plate 26 which is driven in any suitable manner (not shown).

The work is supported between the face plate 26 and the tail stock and is operated upon by any suitable cutting tool and in the form of the invention shown a grinder 27 is utilized for this purpose. The cutter or grinder 27 is carried by a shaft 28 mounted in bearings 29 formed on a bracket 30. The bracket 30 is adjustably mounted on a base plate 31 which in turn is mounted on a carriage 32, these parts having a dovetail connection with each other as shown at 15. The carriage 32 is slidably mounted in a base 33 and has a dovetail sliding connection therewith.

In the operation of the backing off mechanism and of the throw-out mechanism hereinafter described, the carriage 32 with the member 31 and cutter mounted thereon, are moved transversely with reference to the machine and with reference to the work which is supported between the face plate and the tail stock.

The cutter is mounted to travel longitudinally of the work and this longitudinal movement is effected by any suitable driving connections (not shown), such as a screw or other drive and when the cutting tool is used for cutting hobs, means must be provided for permitting the tool to follow the desired contour of the hob teeth which as is well known are not concentric with the hob axis but are cut back on an arc from the cutting edge to give radial clearance, it being understood that the cutting edge is not continuous around the periphery. The backing off movement is obtained by the backing off mechanism which will now be described.

Backing off mechanism.

The backing off mechanism is driven from a shaft 40 which is continuously driven during the operation of the cutter and upon which is mounted a cam 41 which in the embodiment of the invention illustrated is shown as a double cam. It will be understood, however, that if the shaft 40 is driven at twice the speed or if the cam 41 is rotated twice as fast a single cam may be used. The cam 41 is engaged by a cam rider 42 slidably mounted in the machine and the movement of the cam is transmitted through the cam rider 42 to the carriage upon which the cutting tool is mounted. Means is provided however, intermediate the cam rider 42 and the carriage for obtaining varying amounts of backing off movement for the carriage.

This adjustable means comprises a channeled member 43 engageable by the rider and pivotally connected at 44 to a slide 45. A member 46 is adjustably mounted in the channel of the member 43 and this member has pivoted therein a stud 47 formed on or secured to a block 48. The block 48 extends upwardly through a slot 49 in the carriage 32 and is longitudinally adjustable in this slot by means of a screw 50 which is threaded into the block as shown in Figs. 4 and 11. A dowel pin 51 is provided for guiding the block in its movement and an eccentric 52 is mounted in the carriage and is engageable with the block to lock the block in adjusted position. As shown in Fig. 11 a mark 53 on the block coacts with calibrations 54 on the carriage to indicate the position of adjustment of the block. In order to move the carriage in the opposite direction from that in which it is moved by the cam 41 and cam rider 42 a compression spring 55 is mounted in the base 33 between an adjustable screw 56 by means of which the compression of the spring may be adjusted and a sliding block 57. The block 57 carries a pin 58 on which is mounted a roller 59 positioned to engage the channeled member 43.

The backing off mechanism operates as follows. When the cam 41 is rotated the rider 42 is actuated and engages the channeled member 43. The member 43 carries the parts 46 and 48 and is swung about its pivot 44. As the member 43 is swung about its pivot the block 48 will be also swung and the amount of swing of the block is determined by the position of adjustment thereof in the channel of the member 43. It will readily be understood that as the block is adjusted farther away from the pivot 44, the block will have a greater swing and will thereby transmit a greater movement to the sliding carriage 32 through which the block extends. If the cutting tool is being used to cut internal threads the screw 50 will be turned in a direction to move the block 48 to the opposite side of the pivot 44 of the member 43. The carriage and rider are moved in the opposite direction to that in which they are actuated by the cam, by the action of the spring 55. It will thus be seen that a very sensitive and exact adjustment has been provided for determining the backing off movement and the carriage and the tool mounted thereon.

When the cutting tool has reached the end of the "cut" the tool is moved clear of the work in order that the direction of movement of the carriage may be reversed thereby returning the carriage and tool to the point of initial cut in the work. The means for accomplishing this throw-out movement of the tool consists of certain mechanism which may be termed the throw-out or clearance mechanism and the construction of the mechanism will now be described.

*Throw-out or tool clearance mechanism.*

As shown in Fig. 2 a rack bar 60 is secured to the rear of the machine and upon this bar is adjustably secured a pair of stops 61 and 62. These stops may be adjusted to any desired position on the bar, the position of the stops being determined by the length of the cut.

The trip mechanism for setting in motion the drive by means of which the carriage and tool are moved away from the work, is supported on a bracket 63 secured to the carriage 32 and movable therewith as the carriage is fed longitudinally of the machine and work.

Referring particularly to Figs. 5, 7 and 8, the means adapted to coact with the stops 61 and 62 and set in motion the throw-out mechanism comprises in the first instance a finger 64 carried by a pivot arm 65 rotatably mounted on a pintle 66 pivoted in a portion of the bracket 63 or parts carried thereby. A stud 67 projects upwardly from the arm 65 and extends through an arcuate slot 68 formed in a cam member 69 carried by the pintle 66 and having a pair of cam surfaces or cams 70 formed thereon. The arm 65 also has a pin 71 extending outwardly therefrom and engaged by a spring 72, the opposite end of which is fixed as shown at 73. The spring 72 tends to retain the finger 64 in its intermediate position.

A spring pressed slide 74 is slidably mounted in a casing 75 carried by the bracket 63 and has at one end a V-shaped edge 76 engaging the cam member 69. The slide 74 is actuated toward the cam by a spring 77 through the agency of a slidable block 78.

A plunger 79 is slidably mounted in the end of the slide 74 adjacent the cam member 69 and is actuated upwardly by a spring 80, the upward movement being limited by a pin and slot connection 81, 82. The upper end of the plunger 79 is provided with a tooth 83 adapted to engage a downwardly extending finger 84 of a trigger 85 pivoted at 86 and in the casing 75. The trigger 85 also has a downwardly extending finger 87 adapted to engage the end of the slide 74.

A spring 88 and slide block 89 engage the trigger and tend to rotate it in a clockwise direction.

The trigger 85 has its upper end somewhat pointed as shown at 90 and has formed therein on one side below the pointed portion 90 a beveled portion 91, the purpose of which will be hereinafter described. The upper end 90 of the trigger engages what may be termed the inner end 92 of a lever 93 pivoted at 94 in the casing 75 and having formed at its end opposite the end 92 a handle 96.

The lever 93 is normally actuated in an upward direction by means of a member 97 which is actuated by a spring 98. The member 97 has formed therein a transverse slot 99 which receives a pin 100 carried by the lever 93. The actuating member 97 has formed on its upper end a projection 101 which is adapted to be engaged by cams 102 formed on an eccentric 112 hereinafter described. The member 97 is guided in its sliding movement by a threaded pin 104 which engages a slot 105 formed in the member 97.

The lever 93 is connected by a link 106 to a disc 107 pivotally mounted on the shaft 40 and having formed therein a pair of depressions 108 disposed diametrically opposite each other.

A sleeve 109 is keyed or otherwise secured to the shaft 40 and this sleeve has a laterally extending flange 110 at one end having ratchet teeth 111 formed on one side thereon.

The eccentric 112 is rotatably mounted on the sleeve 109 and is adapted to be driven by the ratchet teeth 111 on the sleeve flange 110 in the following manner. A plunger 113 is slidably mounted in the eccentric 112 and has mounted in one end thereof a roller 114 adapted to seat in one or the other of the depressions 108 formed in the disc 107. A second plunger 115 is slidably mounted in the plunger 113 and has formed on its outer end a tooth 116 adapted to mesh with the ratchet teeth 111. A spring 117 tends to press the second plunger 115 outwardly and a pin and slot connection 118, 119 between the plunger 115 and the plunger 113 limits the outward movement of the plunger under the action of the spring 117. A spring 120 seats against an end wall 121 of the opening in which the plunger 113 is mounted and engages at its opposite end a shoulder 122 formed on the plunger 113. This spring 120 tends to push the plunger toward the disc 107 and when one of the depressions 108 is disposed in alinement with the roller 114 carried by the plunger 113, this roller will seat in the depression.

The plungers 113 and 115 and the pin and slot connection 118, 119 are so relatively constructed and arranged that when the plunger 113 and roller 114 are disposed in alinement with one of the depressions 108 in the disc 107 and the roller 114 is seated in the depression, the tooth 116 formed on the outer end of the plunger 115 will not engage the ratchet teeth 111. When, however, the roller 114 rides out of the depression 108 on to the surface of the disc 107 the plungers 113 and 115 will be moved toward the plunger 110 and will cause the tooth 116 to engage the ratchet teeth. The spring 117 is provided for safety reasons in order to prevent breakage of the tooth 116 or the ratchet teeth when these parts are not properly positioned with reference to each other at the time the plungers are moved toward the ratchet. Since the ratchet is positively driven from the shaft 40 the eccentric 112 will be driven through the ratchet when the tooth 116 is moved into engagement therewith.

In order to insure the stopping of the eccentric at the end of one half of one revolution, a plunger 123 is slidably mounted in the eccentric 112 and is disposed substantially diametrically opposite the plunger 113. A spring 124 is seated in the pocket in the eccentric in which is positioned the plunger 123 and tends to force this plunger in the direction of the disc 107. The plunger 123 carries a roller 125 similar to the roller 114 and adapted to engage one or the other of the depressions 108 in the disc 107. A pin 126 is carried by the plunger 123 and extends through a slot 127 in the eccentric into a groove 128 formed in an eccentric strap 129 which surrounds the eccentric 112. The eccentric strap 129 has formed therein a pair of notches 130 communicating with the groove 128. When the eccentric completes one half of one revolution the spring 124 will cause the plunger 123 and pin 126 to move longitudinally in the socket in which this plunger is disposed due to the fact that the roller 125 will seat in one of the depressions 108. When these parts move longitudinally the pin 126 will snap into one of the notches 130 thereby positively arresting the rotational movement of the eccentric. In order to insure the release of the pin 126 from the notch 130 prior to the engagement of the ratchet with the tooth 116 of the plunger 115, the plunger 123 is set to act slightly ahead of the plunger 113 and in Fig. 13 the angle of advance is indicated as three degrees.

When the trip mechanism has been actuated thereby rotating the disc 107 and causing the actuation of the plungers 113 and 123 the eccentric 112 and eccentric strap 129 will be set in motion. As shown in Fig. 3 the eccentric strap 129 comprises a substantially cylindrical portion 131 and a laterally projecting portion 132. The portion 132 has secured thereto a stud or pin 133 that is positioned in a slot 134 formed in the slide 45. The projecting portion 132 has also formed therein slideways 135 in which is slidably mounted a block or nut 136. This block is provided with screw threads 137 into which is threaded a screw 138 rotatably mounted in the eccentric strap member and having a handle 139 by means of which it may be adjusted. The screw 138 has formed therein a groove 140 in which is positioned a pin 141 carried by the eccentric strap member for preventing the longitudinal movement of the screw. As the screw is rotated, therefore, the nut or block 136 will be adjusted in the ways 135.

The block 136 is disposed in alinement with one end of the slide 45 and as the eccentric strap and block are reciprocated by the eccentric, the block will engage the slide 45 and through its engagement with the slide will move the carriage in a direction to throw the tool out of engagement with the work. The position of adjustment of the nut 136 will determine the amount of throw-out movement of the carriage and cutting tool and in the particular machine being described the maximum throw-out movement is five-sixteenths of an inch. If the nut or block 136 is adjusted by the screw 138 so that it will normally engage the end of the slide 45, the slide carriage and tool will have the maximum throw-out movement. If, however, as shown in Fig. 4, the block 136 is spaced from the slide, the eccentric strap and block will travel through a portion of their movement before the slide is engaged.

The operation of the mechanism for moving the tool clear of the work or for effecting the throw-out movement will now be described. When the carriage has traveled longitudinally on the machine frame and longitudinally of the work to the end of the cut, the finger 64 will engage one of the stops 61, 62 and will swing the member 65 on the spindle or pin 66. This swinging movement will cause the stud 67 to engage one end of the slot 68 of the cam member 69 and further swinging movement will cause the cam member 69 to swing thereby causing one of the cam surfaces 70 to engage and move the slide 74. The slide 74 carries with it the plunger 79 and the tooth 83 on the plunger 79 by reason of its engagement with the finger 84 on the trigger 85 will trip the trigger thereby releasing the lever 93.

The lever 93 will thereupon be swung in an anti-clockwise direction by the plunger 97 and by reason of the link connection 106 the lever will rotate the disc 107. As the disc is rotated the plungers 113 and 123 will be forced longitudinally in their sockets since the rollers 114 and 125 will be moved out of the depressions 108. The plunger 123 will release the eccentric from the eccentric strap and the plunger 113 will, due to the engagement of the tooth 116 with the ratchet 111, cause the rotation of the eccentric and the reciprocation of the eccentric strap. As the eccentric is rotated and the strap 129 reciprocated, the nut or block 136 will engage the slide 45 and move the slide longitudinally.

It will be remembered that the slide 45 carries the channel member 43 and that the channeled member in turn carries the block 48 through which the carriage 32 and tool carried thereby are actuated. The adjustment of the nut 136 as before stated determines the amount of movement of the carriage and the tool.

The spring 72 will automatically return the finger 64 to its intermediate position when the finger has moved away from the stop 61. The cam member 69 however, will be retained in its swung position with the end 76 of the slide 74 positioned on one of the cam surfaces 70 until the finger 64 engages the stop at the opposite end of the travel of the carriage whereupon the cam member 69 will be swung to its other extreme position momentarily moving the plunger 79 and tooth 83 of the slide 74 to tripping position as shown in Fig. 9, but immediately thereafter again moving these parts away from the trigger. When the trigger has been actuated the parts assume the position shown in Fig. 10 in which it will be noted that the end portion 92 of the lever 93 is positioned on the bevel 91 formed in the trigger thereby holding the trigger in released position until the lever 93 is reset by the engagement of one of the cams 102 with the plunger 97. During this operation, the action of the spring pressed plunger 97 on the lever 93 will cause the lever to swing the trigger 85 thereby forcing the slide 74 to the right (Figs. 5, 8, 10) so that the finger 84 of the trigger will clear the tooth 83 of plunger 79. When the slide 74 is actuated and releases the trigger the finger 87 of the trigger by its movement with the end of the slide 74 renders the movement of the slide more positive.

It will be noted that when the eccentric strap has completed a part of its one half revolution, one of the cams 102 will engage the end 101 of the plunger 97 thereby forcing this plunger downwardly and causing the lever 93 to return to the position shown in Fig. 5. When the lever returns to this position the spring plunger 89 will swing the trigger 85 into the position shown in Fig. 9 and the end portion 92 of the lever 93 by its engagement with the upper end 90 of the trigger will retain the trigger in position to be again actuated by the slide 74.

This actuation takes place when the finger 64 engages the stop 62 positioned at the point of initial cut and upon this actuation of or tripping of the trigger the table and cutter will be returned to cutting position with great precision and exactness.

In order to permit the manual tripping of the trigger, the trigger pivot pin 86 has secured to its outer end which extends through the casing a trip finger 150. The lever 93 may be manually reset by the use of the handle.

From the foregoing specification it will be seen that a very positive and effective mechanism has been devised for effecting the backing-off movement and throw-out movement of the tool in machines of the character described.

Although one specific embodiment of the invention has been particularly described and illustrated it will be understood that the invention is capable of modification and that further changes in the construction and in the arrangement of the various cooperating parts may be made without departing from the spirit or scope of the invention as expressed in the following claims.

What we claim is:—

1. In a machine of the class described, a frame, work supporting means thereon, a carriage mounted for transverse movement on the frame and relative to the work, a tool mounted on the carriage and periodically operable backing off mechanism for moving the carriage and tool transversely relative to the work, said mechanism including a cam, a rider actuated thereby, an oscillatable member separate from and engageable and oscillatable by said rider, an adjustable connection between said member and the carriage, and mechanism for moving the carriage and tool clear of the work at a predetermined point in the movement of the carriage, said last named mechanism including a member adapted to move said oscillatable member bodily.

2. In a machine of the class described, a frame, work supporting means thereon, a carriage mounted for transverse movement on the frame and relative to the work, a tool mounted on the carriage and periodically operable backing off mechanism for moving the carriage and tool transversely relative to the work, said mechanism including a cam, a rider actuated thereby, an oscillatable channeled member engageable by said rider, and an adjustable connection between said member and the carriage, and mechanism including a member adapted to actuate said oscillatable member for moving the carriage and tool clear of the work at a predetermined point in the movement of the carriage.

3. In a machine of the class described, a frame, work supporting means thereon, a carriage mounted for transverse movement on the frame and relative to the work, a tool mounted on the carriage and periodically operable backing off mechanism for moving the carriage and tool transversely relative to the work, said mechanism including a cam, a rider actuated thereby, an oscillatable channeled member engageable by said rider, and an adjustable block adjustably mounted in the channel of said member and connecting said member and the carriage, and mechanism including a member adapted to actuate said oscillatable member for moving the carriage and tool clear of the work at a predetermined point in the movement of the carriage.

4. In a machine of the class described, a frame, work supporting means thereon, a carriage mounted for longitudinal and transverse movement on the frame and relative to the work, a tool mounted on the carriage, mechanism for moving the carriage and tool clear of the work at a predetermined point in the longitudinal movement of said carriage, and adjustable means including an eccentric strap and an adjustable operative connection between the strap and carriage for varying the amount of movement of the carriage by said mechanism.

5. In a machine of the class described, a frame, work supporting means thereon, a carriage mounted for longitudinal and transverse movement on the frame and relative to the work, a tool mounted on the carriage, and mechanism including an eccentric, an eccentric strap and an adjustable member carried by said strap for moving the carriage and tool clear of the work at a predetermined point in the longitudinal movement of said carriage.

6. In a machine of the class described, a frame, work supporting means thereon, a carriage mounted for longitudinal and transverse movement on the frame and relative to the work, a tool mounted on the carriage, mechanism including an eccentric and an eccentric strap for moving the carriage and tool clear of the work at a predetermined point in the longitudinal movement of said carriage, and an adjustable operative connection between the eccentric strap and the carriage.

7. In a machine of the class described, a frame, work supporting means thereon, a carriage mounted for longitudinal and transverse movement on the frame and relative to the work, a tool mounted on the carriage, mechanism including an eccentric and an eccentric strap for moving the carriage and tool clear of the work at a predetermined point in the longitudinal movement of said carriage, and an operative connection between the eccentric strap and the carriage including a threaded adjustable member.

8. In a machine of the class described, a frame, work supporting means thereon, a carriage mounted for longitudinal and transverse movement on the frame and relative to the work, a tool mounted on the carriage, and mechanism including an eccentric and an eccentric strap for moving the tool clear of the work and operative connections between the eccentric strap and tool carriage, including a slide operatively connected to the carriage and a block adjustably connected with the strap and engageable with the slide.

9. In a machine of the class described, a frame, work supporting means thereon, a carriage mounted for transverse movement on the frame and relative to the work, a tool mounted on the carriage, mechanism for moving the carriage and tool clear of the work, automatically operable trip mechanism controlling the actuation of said carriage moving mechanism, and supplement means for manually operating said trip mechanism.

10. In a machine of the class described, a frame, work supporting means thereon, a carriage mounted for transverse movement on the frame and relative to the work, a tool mounted on the carriage, mechanism for moving the carriage and tool clear of the work, trip mechanism for controlling the actuation of said carriage moving mechanism, adjustable stops on the frame and a finger engageable with said stops and arranged to actuate said trip mechanism.

11. In a machine of the class described, a frame, work supporting means thereon, a carriage mounted for transverse movement on the frame and relative to the work, a tool mounted on the carriage, mechanism for moving the carriage and tool clear of the work, trip mechanism for controlling the actuation of said carriage moving mechanism, adjustable stops on the frame, a finger engageable with said stops, a cam member movable by said finger and means controlled by said cam member for actuating said trip mechanism.

12. In a machine of the class described, a frame, work supporting means thereon, a carriage mounted for transverse movement on the frame and relative to the work, a tool mounted on the carriage, mechanism for moving the carriage and tool clear of the work, trip mechanism for controlling the actuation of said carriage moving mechanism, adjustable stops on the frame, a finger engageable with said stops, a cam member movable by said finger and means including a trigger releasing slide controlled by said cam member for actuating said trip mechanism.

13. In a machine of the class described, a frame, work supporting means thereon, a carriage mounted for transverse movement on the frame and relative to the work, a tool mounted on the carriage, mechanism for moving the carriage and tool clear of the work, said mechanism including a driving member and a member adapted to be driven thereby and operatively connected to move the carriage and tool and trip mechanism controlling the connection between said driving member and the member adapted to be driven thereby, said trip mechanism including a trigger, a trigger releasing member, a finger adapted to control said releasing member and adjustable stops positioned in the path of travel of the finger.

14. In a machine of the class described, a frame, work supporting means thereon, a carriage mounted for longitudinal and transverse movement on the frame and relative to the work, a tool mounted on the carriage, mechanism for moving the carriage and tool clear of the work at a predetermined point in the longitudinal movement of said carriage for returning the carriage and tool to operative position with respect to the work at another predetermined point in the longitudinal movement of the carriage, and adjustable means including an eccentric strap and an adjustable operative connection between the strap and carriage for varying the amount of movement of the carriage by said mechanism.

15. In a machine of the class described, a frame, work supporting means thereon, a carriage mounted for transverse movement on the frame and relative to the work, a tool mounted on the carriage, mechanism for moving the carriage and tool clear of the work, trip mechanism for controlling the actuation of said carriage moving mechanism, adjustable stops on the frame and a finger engageable with said stops and arranged to actuate said trip mechanism at predetermined limits of the longitudinal travel of the carriage.

16. In a machine of the character described, a frame, work supporting means thereon, a carriage mounted for transverse and longitudinal movement on the frame relative to the work, a tool on said carriage, backing off mechanism for periodically moving the carriage and tool transversely relative to the work, adjustable means including an oscillatable member and an adjustable block carried thereby for varying the backing off movement and mechanism including a member operatively connected with said oscillatable member for moving the carriage and tool clear of the work at a predetermined point in the movement of the carriage.

17. In a machine of the character described, a frame, work supporting means thereon, a carriage mounted for transverse and longitudinal movement on the frame relative to the work, a tool on said carriage, backing off mechanism for periodically moving the carriage and tool transversely relative to the work, adjustable means including an oscillatable member and an adjustable block carried thereby for varying the backing off movement and mechanism including an adjustable member operatively connected with said oscillatable member for moving the carriage and tool clear of the work at a predetermined point in the movement of the carriage.

18. In a machine of the character described, a frame, work supporting means thereon, a carriage mounted for transverse and longitudinal movement on the frame relative to the work supporting means, a tool on said carriage, backing off mechanism for periodically moving the carriage and tool transversely relative to the work, means including an oscillatable member and an adjustable block carried thereby for varying the backing off movement, a channeled member in which said adjustable block is mounted, a reciprocable member carrying said channeled member and means engageable with said reciprocable member for moving the carriage and tool clear of the work at a predetermined point in the movement of the carriage.

19. In a machine of the character described, a frame, work supoprting means thereon, a carriage mounted for transverse and longitudinal movement of the frame relative to the work supporting means, a tool on said carriage, backing off mechanism for periodically moving the carriage and tool transversely relative to the work, means including an oscillatable member and an adjustable block carried thereby for varying the backing off movement, a channeled member in which said adjustable block is mounted, a reciprocable member carrying said channeled member and adjustable means engageable with said reciprocable member for moving the carriage and tool clear of the work at a predetermined point in the movement of the carriage.

In witness whereof, I have hereunto set my hand this 25th day of July, 1922.

MATTHEW S. CUMNER.

In witness whereof, I have hereunto set my hand this 25th day of July, 1922.

FREDK. W. GEISSENHAINER.